P. Hemenway,
Vegetable Cutter.
No. 94,600. Patented Sep. 7. 1869.
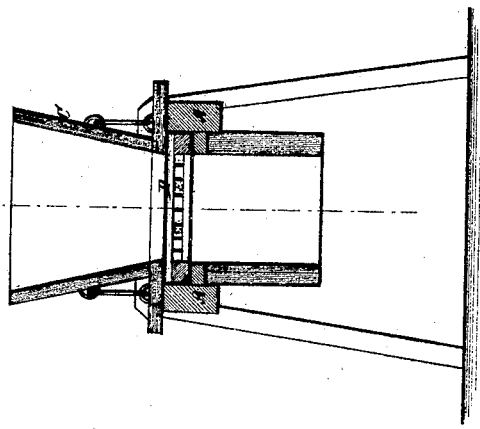
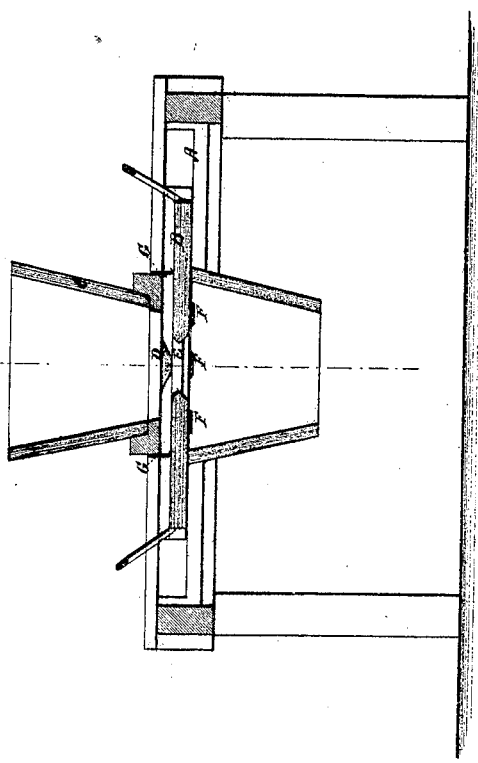
Witnesses:
A Bennewendorf
Wm H Clark
Inventor:
J. Hemenway
Per Munn & Co,
Attorneys.

United States Patent Office.

R. HEMENWAY, OF NEW CASSEL, WISCONSIN.

Letters Patent No. 94,600, dated September 7, 1869.

IMPROVEMENT IN VEGETABLE-CUTTER.

The Schedule referred to in these Letters Patent and making part of the same.

*To all whom it may concern:*

Be it known that I, R. HEMENWAY, of New Cassel, in the county of Fond du Lac, and State of Wisconsin, have invented a new and improved Vegetable-Cutter; and I do hereby declare that the following is a full, clear, and exact description thereof, which will enable others skilled in the art to make and use the same, reference being had to the accompanying drawings, forming part of this specification.

The object of this invention is to provide a simple and efficient machine for cutting roots, vegetables, &c., for feeding animals.

The invention consists in the application on a suitable bench, and between the table thereof, having transverse fixed knives across a passage through it, and a hopper above, of a slide, provided with a lateral two-edged knife, cutting both ways, and a series of knives below the said double-edged cutter, which receive the slices therefrom, cutting them into smaller pieces, which are again cut by the fixed knives in the table below. The said slide is arranged to be worked either by one or two persons.

Figure 1 represents a longitudinal section of my improved cutter, and

Figure 2 represents a transverse section of the same.

Similar letters of reference indicate corresponding parts.

A represents the table;

B, the slide; and

C, the hopper.

The said slide carries a two-edged cutter, D, arranged across it, to cut, when moving either way, the vegetables resting on the slide into slices.

E represents a gang cf thin cutters arranged in the slide at right angles to the cutter D, so as to receive the slices made by it, which slices are forced down upon the said cutters E by the action of the inclined sides of the cutter D, and thereby cut into smaller pieces, which, on emerging below, encounter the fixed cutters F to be again cut.

G represents stops at the end of the movement of the cutter D, to prevent the escape of the pieces thereat.

This apparatus is very simple in construction, and calculated to cut the vegetables very fine, and in a manner to be done without much labor.

Having thus described my invention,

I claim as new, and desire to secure by Letters Patent—

The combination, with the bench A and hopper C, of the sliding cutters D E, fixed cutters F, and stops G, all substantially as specified.

R. HEMENWAY.

Witnesses:
DILLON P. SLATER,
M. S. SLATER.